*(12)* United States Patent
Chang

(10) Patent No.: US 10,902,555 B2
(45) Date of Patent: Jan. 26, 2021

(54) METHOD AND DEVICE FOR PROCESSING PICTURE

(71) Applicant: BEIJING KINGSOFT INTERNET SECURITY SOFTWARE CO., LTD., Beijing (CN)

(72) Inventor: Yen-cheng Chang, Beijing (CN)

( * ) Notice: Subject to any disclaimer, the term of this patent is extended or adjusted under 35 U.S.C. 154(b) by 65 days.

(21) Appl. No.: 16/417,036

(22) Filed: May 20, 2019

(65) Prior Publication Data

US 2019/0279336 A1 Sep. 12, 2019

Related U.S. Application Data

(63) Continuation of application No. PCT/CN2017/101778, filed on Sep. 14, 2017.

(30) Foreign Application Priority Data

Nov. 21, 2016 (CN) .......................... 2016 1 1041554

(51) Int. Cl.
*G06K 9/00* (2006.01)
*H04N 7/18* (2006.01)
(Continued)

(52) U.S. Cl.
CPC ................ *G06T 3/40* (2013.01); *G06T 5/009* (2013.01); *G06T 5/50* (2013.01); *G06T 9/00* (2013.01);
(Continued)

(58) Field of Classification Search
USPC ........ 382/100, 103, 106–107, 155–156, 162, 382/168, 173, 181, 220, 224, 232, 254,
(Continued)

(56) References Cited

U.S. PATENT DOCUMENTS 7,852,936 B2 * 12/2010 Mukerjee ............... H04N 19/16
375/240.15
10,523,981 B2 * 12/2019 Gilbert ............... H04N 21/4316
(Continued)

FOREIGN PATENT DOCUMENTS

| CN | 105100641 A | 11/2015 |
|----|-------------|---------|
| CN | 106780363 A | 5/2017 |

OTHER PUBLICATIONS

International Search Report issued in International Application No. PCT/CN2017/101778 dated Dec. 19, 2017 (2 pages).
(Continued)

*Primary Examiner* — Seyed H Azarian
(74) *Attorney, Agent, or Firm* — Osha Bergman Watanabe & Burton LLP

(57) ABSTRACT

Embodiments of the present disclosure provide a method and a device for processing a picture and an electronic device. The method includes scaling a raw picture to obtain N scaled pictures with different resolutions, where N is a natural number greater than or equal to 2; mapping the N scaled pictures respectively into N content picture each with a same predetermined style feature through a neural algorithm network; scaling the N content pictures to have the same resolution; and encoding and combining the N content images of the same resolution into a dynamic video.

17 Claims, 2 Drawing Sheets

(51) Int. Cl.
   *G06T 3/40*   (2006.01)
   *G06T 5/00*   (2006.01)
   *G06T 5/50*   (2006.01)
   *G06T 9/00*   (2006.01)

(52) U.S. Cl.
   CPC .............. *G06T 2207/20084* (2013.01); *G06T 2207/20221* (2013.01)

(58) Field of Classification Search
   USPC ....... 382/260, 274, 276, 286–291, 305, 312; 348/39, 143
   See application file for complete search history.

(56) References Cited

U.S. PATENT DOCUMENTS

| | | | |
|---|---|---|---|
| 2012/0169842 A1* | 7/2012 | Chuang ............ | G08B 13/19619 348/39 |
| 2015/0109436 A1* | 4/2015 | Chen ................ | H04N 19/70 348/143 |
| 2016/0286229 A1* | 9/2016 | Li ..................... | H04N 19/56 |
| 2017/0134654 A1* | 5/2017 | Liu ................... | H04N 5/2621 |
| 2020/0120327 A1* | 4/2020 | Presler .............. | H04N 5/232933 |

OTHER PUBLICATIONS

Written Opinion issued in International Application No. PCT/CN2017/101778 dated Dec. 19, 2017 (5 pages).

Office Action issued in corresponding Chinese Application No. 201611041554.1, dated Mar. 20, 2019 (16 pages including English translation).

\* cited by examiner

METHOD AND DEVICE FOR PROCESSING PICTURE

CROSS-REFERENCE TO RELATED APPLICATION

This application is a continuation application of PCT/CN2017/101778, which claims a priority to Chinese Patent Application Serial No. 201611041554.1, filed on Nov. 21, 2016, the entire content of which is incorporated herein by reference.

FIELD

The present disclosure relates to a field of picture processing technology, and more particularly, to a method and a device for processing a picture and an electronic device.

BACKGROUND

Picture processing is a technique of coloring, picture matting, synthesizing, brightness-shadow modifying, tint modifying, chrome modifying, special effect adding, editing, repairing and the like, such that a processed picture may meet visual, psychological and other requirements of a user.

SUMMARY

A first aspect of the present disclosure provides a method for processing a picture. The method includes: scaling a raw picture to obtain N scaled pictures having different resolutions, where N is a natural number equal to or greater than 2; mapping the N scaled pictures respectively into N content pictures each having a same predetermined style feature by using a neural algorithm network; scaling the N content pictures to have a same resolution; and encoding and combining the N content pictures having the same resolution into a dynamic video.

A second aspect of the present disclosure provides a device for processing a picture. The device includes: a picture scaling module configured to scale a raw picture to obtain N scaled pictures having different resolutions; a picture mapping module configured to map the N scaled pictures respectively into N content pictures each having a same predetermined style feature by using a neural algorithm network; in which the picture scaling module is further configured to scale the N content pictures to have a same resolution; and a picture encoding module, configured to encode and combine the N content pictures having the same resolution into a dynamic video.

A third aspect of the present disclosure provides an electronic device. The electronic device includes a processor, a memory, a communication interface and a bus. The processor, the memory and the communication interface are connected and communicate with each other via the bus. The memory is configured to store executable program codes. The processor is configured to read the executable program codes stored in the memory to run a program corresponding to the executable program codes, to execute a method for processing a picture according to the first aspect of the present disclosure.

A fourth aspect of the present disclosure provides a storage medium. The storage medium is configured to store an application program. The application program is configured to execute a method for processing a picture according to the first aspect of the present disclosure when being running.

A fifth aspect of the present disclosure provides an application program. When the application program is running, a method for processing a picture according the first aspect of the present disclosure is executed by the application program.

BRIEF DESCRIPTION OF THE DRAWINGS

In order to further clearly describe the technical solution of embodiments of the present disclosure, simply descriptions will be made to drawings necessitated by describing embodiments of the present disclosure. Obviously, the drawings described below are merely some embodiments of the present disclosure, and other drawings may be obtained by those skilled in the art without any inventive labors according to these drawings.

DETAILED DESCRIPTION

Now, the technical solution of embodiments of the present disclosure will be described clearly and completely with reference to drawings. Obviously, the described embodiments are merely part, but not all, embodiments of the present disclosure. Based on the embodiments of the present disclosure, other embodiments obtained by those skilled in the art without any inventive labor may be all covered by the scope of the present disclosure.

In related arts, a raw picture may be processed into a picture of an artistic style through a picture processing algorithm. However, due to a limitation of the picture processing algorithm, only a set of static pictures may be generated based on a static picture, or only a dynamic video may be generated based on a dynamic video. As a result, format of the processed picture is monotonous, which is unable to meet requirements of most users.

Therefore, embodiments of the present disclosure provide a method and a device for processing a picture and an electronic device for solving the above problems existing in related arts.

Figure 1:
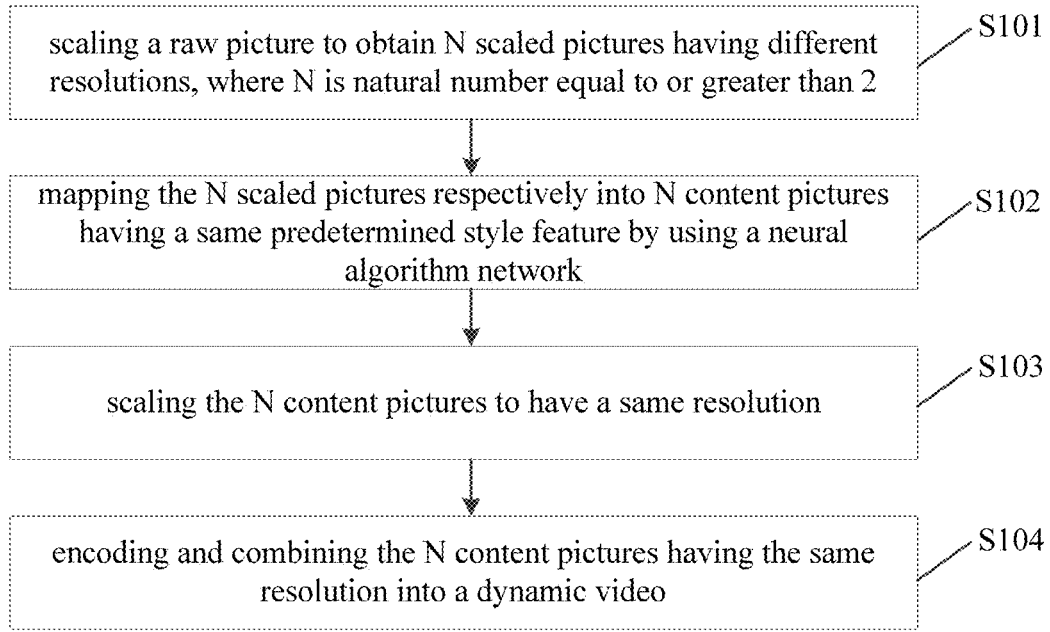
FIG. 1 is a flowchart illustrating a first embodiment of a method for processing a picture according to the present disclosure.

Referring to FIG. 1, FIG. 1 is a flowchart illustrating a first embodiment of a method for processing a picture according to the present disclosure. An execution body of embodiments may be a server, or may be a local user end. As illustrated in drawings, the method may include the following.

In block S101, a raw picture is scaled to obtain N scaled pictures having different resolutions, where N is a natural number equal to or greater than 2.

In detailed implementations, the raw picture may be scaled by modifying a picture property of the raw picture to obtain the N scaled pictures having different resolutions. The picture property includes at least one of picture size, picture format and picture compression mode. The resolution refers to a resolution frequency of a picture.

Alternatively, the number of the N scaled pictures is obtained by multiplying the number of frames contained in a dynamic video and a playing time length of the dynamic video. For example, when it is required to obtain a dynamic video having a time length of 1.5 seconds and a frequency of 2 video segments (frames) per second, the raw picture may be scaled to obtain 3 scaled pictures, where 2*1.5=3. Resolutions of the 3 scaled pictures may be gradually reduced based on the resolution of the raw picture. The reduced scales may be determined based on an actual machine computing speed and a resolution-reduced picture quality. For example, the reduced scales for the three scaled pictures may be respectively 97%, 94% and 91%, but embodiments of the present disclosure are not limited thereto.

In block S102, the N scaled pictures are respectively mapped to N content pictures each having a same predetermined style by using a neural algorithm network.

In detailed implementations, a reconstruction loss between a raw image and an output image of an image conversion network with the raw image as an input may be calculated through a loss network. Based on the reconstruction loss, a mapping weight parameter of the neural algorithm network may be determined. Based on the mapping weight parameter, the N scaled pictures may be mapped respectively to the N content pictures each having the same predetermined style feature.

Figure 2:
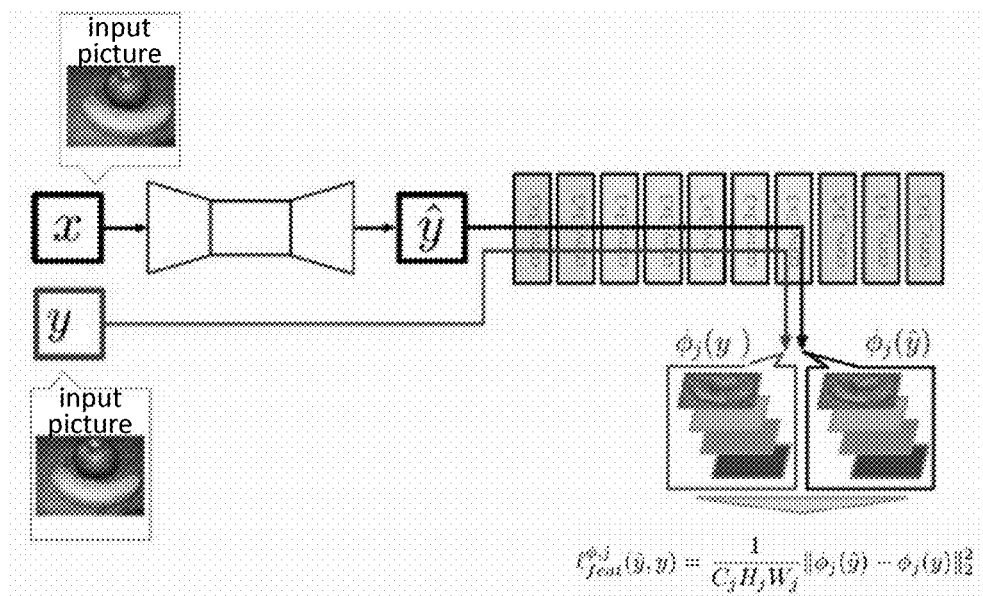
FIG. 2 is a schematic diagram illustrating a neural algorithm network according to embodiments of the present disclosure.

As illustrated in FIG. 2, FIG. 2 is a schematic diagram illustrating a neural algorithm network according to embodiments of the present disclosure. The neural algorithm network may include an image conversion network $f_w$ and a loss network $\varphi$. The image conversion network $f_w$ is a deep residual convolution neural network, having a weight parameter of w, which may convert an inputted image x into an image $\hat{y}$ having the style feature through a mapping $\hat{y}=f_w(x)$. The loss network $\varphi$ is also a convolution network, which may calculate the weight parameter w of the image conversion network $f_w$ through pre-training.

The loss network $\varphi$ defines a plurality of loss functions, including a feature reconstruction loss function and a style reconstruction loss function. The feature reconstruction loss function is configured to measure a high-order semantic loss between the raw image x and the outputted image $\hat{y}$ of the image conversion network $f_w$, where $\hat{y}$ is obtained through the conversion $\hat{y}=f_w(x)$. When it is desired to measure the high-order semantic loss between x and $\hat{y}$, the high-order semantic features need to be extracted therefrom, using the loss network $\varphi$. Euclidean distance may be calculated. The high-order semantic loss between x and $\hat{y}$ may be denoted as $$l^{\varphi,j}_{feat}(\hat{y}, y_i) = \frac{1}{C_j H_j W_j} \left\| \varphi_j(\hat{y}) - \varphi_j(y) \right\|_2^2,$$

where j denotes a $j^{th}$ layer of the loss network, and $C_j H_j W_j$ denotes a product of picture channel, picture length, and picture width of the $\varphi_j(\hat{y})$ and $\varphi_j(y)$.

In addition, the style reconstruction loss function is configured to measure a high-order semantic loss between a style image $y_s$ and an output image $\hat{y}$ through the image conversion network $f_w$. Since the style feature of the image has no special properties, $\varphi_j(y)$ is converted to a Gram matrix $$G^{\varphi}_j(y) = \frac{\varphi \varphi^T}{C_j H_j W},$$

where $\phi$ is a $C_j H_j W$-dimensional matrix obtained by converting $\varphi_j(y)$, and the high-order semantic loss is denoted as $l^{\varphi,j}_{style}(\hat{y}, y_i) = \|G_j(\hat{y}) - G_j(y)\|_F^2$, where $G_j(\hat{y})$ and $G_j(\hat{y})$ are Frobenius norms.

After the high-order semantic loss between the raw image x and the output image $\hat{y}$ of the image conversion network $f_w$ and the high-order semantic loss between the style image $y_s$ and the output image $\hat{y}$ of the image conversion network $f_w$ are measured, the weight parameter may be determined as $$w = \arg\min_{w} E_{x,\{y_i\}} \left[ \sum_{i=1} \lambda_i l_i(f_w(x), y_i) \right],$$

where $\lambda$ denotes a ratio of an $i^{th}$ loss function to all loss functions, i is the number of the loss functions. A respective image conversion network $f_{s,w}$ may be trained for each style s. After the inputted image x is inputted to a trained image conversion network $f_{s,w}$, a content picture having the style s may be obtained.

It should be noted that, with the above neural algorithm network, the N content pictures may be applied with the style within a short time using methods of GPU acceleration calculation, quick style model extraction and multi-step operation. For example, using AWS p2.xlarge, K80 GPU instance (server), compared to a 8-core Intel Xeon E5-2670 v2, when processing a picture of 720×720, the time for processing a single picture may be reduced from 7.78 seconds to 0.81 seconds, thereby improving performance by 8.59 times.

In block S103, the N content pictures are scaled to have a same resolution.

In detailed implementations, since the resolutions of the N content pictures obtained by the mapping are different from each other, it is required to process the N content pictures to have the same resolution. The process is same to the scaling method of block S101, which is not described herein.

In block S104, the N content pictures having the same resolution are encoded and combined into a dynamic video.

In detailed implementations, the picture may be encoded and compressed using ffmepg video encoding software, such as x264 codec.

In embodiments of the present disclosure, the neural algorithm network mainly uses the neural algorithm of an artistic style. Due to a randomness property of the neural network, outputted results of the neural algorithm may vary with resolutions of the raw picture inputted to the neural algorithm of the artistic style. Under this fact, when a single static picture is inputted, a plurality of pictures having different resolutions may be obtained. Through the neural algorithm of the artistic style, N pictures each having the same article style but different content may be outputted. The N pictures are combined into a dynamic video.

Figure 3:
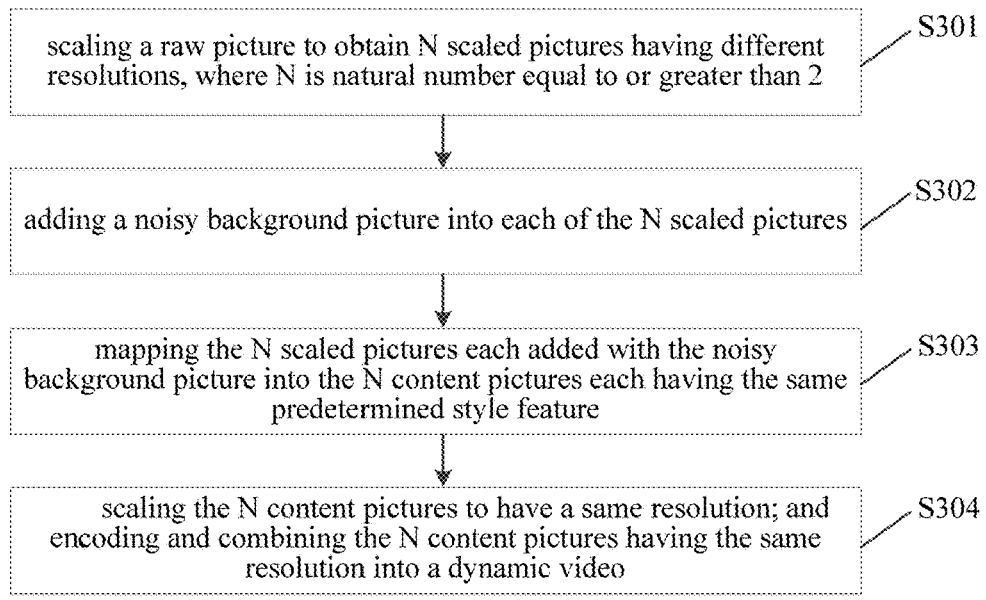
FIG. 3 is a flowchart illustrating a second embodiment of a method for processing a picture according to the present disclosure.

Referring to FIG. 3, FIG. 3 is a flowchart illustrating a second embodiment of a method for processing a picture according to the present disclosure. As illustrated in FIG. 3, the method according to embodiments of the present disclosure may include the following.

In block S301, the raw picture is scaled to obtain N scaled pictures having different resolutions.

In detailed implementations, by modifying a picture property of the raw picture, the raw picture may be scaled to obtain N scaled pictures having different resolutions. The picture property includes at least one of picture size, picture format and picture compression mode. The resolution refers to a resolution frequency of the picture.

Alternatively, the number of the N scaled pictures may be a product of the number of frames contained in a dynamic video and a playing time length of the dynamic video. For example, when it is required to obtain a dynamic video having a time length of 1.5 seconds and a frequency of 2 frames per second, 3 scaled pictures may be obtained by scaling the raw picture, where 2*1.5=3. Resolutions of the 3 scaled pictures may be gradually reduced based on the resolution of the raw picture. The reduced scales may be determined based on an actual machine computing speed and a resolution-reduced picture quality. For example, the reduced scales for the three scaled pictures may be 97%, 94% and 91% respectively, but embodiments of the present disclosure are not limited thereto.

In block S302, a noisy background picture is added to each of the N scaled pictures.

In block S303, the N scaled pictures each added with the noisy background picture are mapped to N content pictures each having a same predetermined style feature. The scaled picture having the added noisy background picture as its background may be converted into a content picture having the artistic style, via the neural algorithm network. A respective noisy picture may be generated on the content picture. As a result, the outputted pictures are different from each other.

In detailed implementations, a reconstruction loss between a raw image and an output image of the image conversion network with the raw image as an input may be calculated through the loss network. Based on the reconstruction loss, a mapping weight parameter of the neural algorithm network may be determined. Based on the mapping weight parameter, the N scaled pictures may be respectively mapped to the N content pictures each having the same predetermined style feature.

In block S304, the N content pictures are scaled to obtain a same resolution. The N content pictures having the same resolution are encoded and merged to a dynamic video.

In detailed implementations, since the resolutions of the N content pictures obtaining by the mapping are different from each other, it is required to process the N content pictures to obtain the same resolution. The N content pictures having the same resolution may be encoded and combined into a single dynamic video. For example, the picture may be encoded and compressed using ffmepg video encoding software, such as x264 codec.

In embodiments of the present disclosure, the neural algorithm network mainly uses a neural algorithm of an artistic style. Due to a randomness property of the neural network, outputted results of the neural algorithm may vary with resolutions of the raw picture inputted to the neural algorithm of the artistic style. Under this fact, when a single static picture is inputted, a plurality of pictures having different resolutions may be obtained. Through the neural algorithm of the artistic style, N pictures each having the same article style but different content may be outputted. The N pictures are combined into a single dynamic video.

Figure 4:
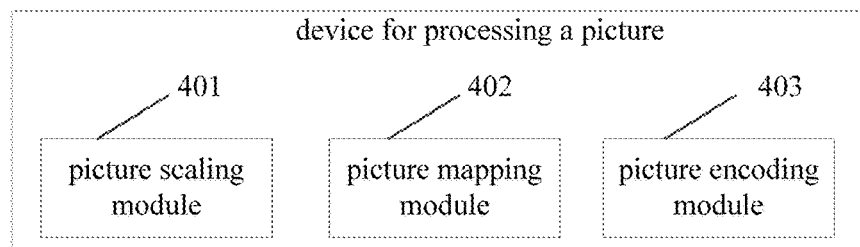
FIG. 4 is a block diagram illustrating a device for processing a picture according to embodiments of the present disclosure.

Referring to FIG. 4, FIG. 4 is a block diagram illustrating a device for processing a picture according to embodiments of the present disclosure. As illustrated in FIG. 4, the device may include the following.

A picture scaling module 401 is configured to scale a raw picture to obtain N scaled pictures having different resolutions.

In detailed implementations, the raw picture may be scaled to obtain N scaled pictures having different resolution by modifying a picture property of the raw picture. The picture property may include at least one of picture size, picture format and picture compression mode. The resolution refers to a resolution frequency of the picture.

Alternatively, the number of the N scaled pictures may be a product of the number of frames contained in a dynamic video and a playing time length of the dynamic video. For example, when it is required to obtain a dynamic video having a time length of 1.5 seconds and a frequency of 2 frames per second, the raw picture may be scaled to obtain 3 scaled pictures, where 3=2*1.5. Resolutions of the 3 scaled pictures may be gradually reduced based on the resolution of the raw picture. The reduced scales may be determined based on an actual machine computing speed and a resolution-reduced picture quality. For example, the reduced scales for the three scaled pictures may be respectively 97%, 94% and 91% respectively, but embodiments of the present disclosure are not limited thereto.

A picture mapping module 402 is configured to map the N scaled pictures respectively to N content pictures each having a same predetermined style feature by using a neural algorithm network.

In detailed implementations, a reconstruction loss between a raw image and an output image of an image conversion network with the raw image as an input may be calculated through a loss network. Based on the reconstruction loss, a mapping weight parameter of the neural algorithm network may be determined. Based on the mapping weight parameter, the N scaled pictures may be mapped respectively to the N content pictures each having the same predetermined style feature.

As illustrated in FIG. 2, FIG. 2 is a schematic diagram illustrating a neural algorithm network according to embodiments of the present disclosure. The neural algorithm network is described above and is not described herein.

It should be noted that, with the above neural algorithm network, the N content pictures may be applied with the style within a short time using methods of GPU acceleration calculation, quick style model extraction and multi-step operation. For example, using AWS p2.xlarge, K80 GPU instance (server), compared to a 8-core Intel Xeon E5-2670 v2, when processing a picture of 720×720, the time for processing a single picture may be reduced from 7.78 seconds to 0.81 seconds, thereby improving performance by 8.59 times.

Alternatively, a noisy background picture may be added to each of the N scaled pictures. The N scaled pictures each added with the noisy background picture are mapped respectively to N content pictures each having the same predetermined style feature. The scaled picture having the added noisy background picture as its background may be converted into a content picture having the artistic style through the neural algorithm network, and a respective noisy picture may be generated on the content picture. As a result, the outputted pictures are different from each other.

The picture scaling module 401 is further configured to scale the N content pictures to obtain a same resolution.

Since the resolutions of the N content pictures obtained by the mapping are different from each other, it is required to process the N content pictures to have the same resolution. The process is same to the above scaling method and is not described herein.

A picture encoding module 403 is configured to encode and combine the N content pictures having the same resolution into a dynamic video.

In detailed implementations, the picture may be encoded and compressed using ffmepg video encoding software, such as x264 codec.

In embodiments of the present disclosure, the neural algorithm network mainly uses a neural algorithm of an artistic style. Due to a randomness property of the neural network, outputted results of the neural algorithm may vary with resolutions of the raw picture inputted to the neural algorithm of the artistic style. Under this fact, when a single static picture is inputted, a plurality of pictures having different resolutions may be obtained. Through the neural algorithm of the artistic style, N pictures each having the same article style but different content may be outputted. The N pictures are combined into a dynamic video.

Figure 5:
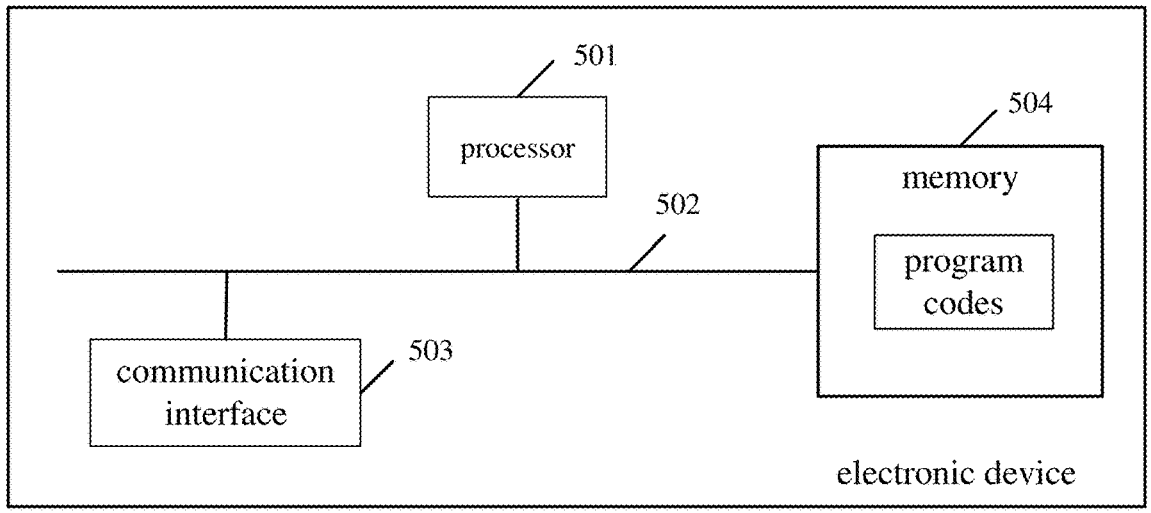
FIG. 5 is schematic diagram illustrating an electronic device according to embodiments of the present disclosure.

Referring to FIG. 5, FIG. 5 is a schematic diagram illustrating an electronic device according to embodiments of the present disclosure. As illustrated in FIG. 5, the electronic device may include at least one processor 501, such as CPU, at least one communication interface 503, at least one memory 504, and at least one communication bus 502. The communication bus 502 may be configured to facilitate connection and communication among these components. For example, the communication interface 503 of the electronic device according to embodiments of the present disclosure may be a wired transmission port, or may be a wireless device, such as an antenna device, for communicating signaling and data with another node device. The memory 504 may be a high speed RAM (random access memory) memory, or may be a non-volatile memory, such as at least one dish memory. The memory 504 may be alternatively at least one storage device remoted from the processor 501. The memory 504 has a set of program codes stored thereon. The processor 501 is configured to read the program codes stored in the memory, to execute the following operations.

A raw picture is scaled to obtain N scaled pictures having different resolution, where N is a natural number equal to or greater than 2.

The N scaled pictures are mapped respectively into N content pictures each having a same predetermined style feature by using a neural algorithm network.

The N content pictures are scaled to have a same resolution.

The N content pictures having the same resolution are encoded and combined into a dynamic video.

In an example, the number of the N scaled pictures is a product of the number of frames contained in the dynamic video and a playing time length of the dynamic video.

In an example, the processor 501 is further configured to add a noisy background picture into each of the N scaled pictures; and map the N scaled pictures each added with the noisy background picture into the N content pictures each having the same predetermined style feature.

In an example, the processor 501 is further configured to calculate a reconstruction loss via a loss network. The reconstruction loss is a loss between a raw image and an outputted image of an image conversion network with the raw image as an input.

The processor 501 is further configured to determine a mapping weight parameter of the neural algorithm network based on the reconstruction loss.

The processor 501 is further configured to map the N scaled pictures respectively into the N content pictures each having the same predetermined style picture based on the mapping weight parameter.

In an example, the processor 501 is further configured to scale the raw picture to obtain the N scaled pictures having different resolutions by modifying a picture property of the raw picture. The picture property includes at least one of picture size, picture format and picture compression mode.

It should be noted that, embodiments of the present disclosure further provides a storage medium. The storage medium is configured to store an application program. The application program is configured to execute operations executed by an electronic device in a method for processing a picture as illustrated in FIG. 1 and a method for processing a picture as illustrated in FIG. 3.

It should be noted that, embodiments of the present disclosure further provide an application program. When the application program is running, operations executed by an electronic device in a method for processing a picture illustrated in FIG. 1 and a method for processing a picture illustrated in FIG. 3 are executed.

It should be noted that, foregoing method embodiments, for sake of simple description, are all expressed as a series of action combinations. However, those skilled in the art should understand that the present application is not limited by the described action sequence, since certain steps may be performed in other sequences or concurrently in accordance with the present disclosure. In addition, those skilled in the art should also understand that embodiments described in the specification are all preferred embodiments, and the actions and modules involved are not necessarily required by the present disclosure.

In above embodiments, descriptions of the various embodiments have different emphasis, and details that are not described in detail in a certain embodiment may be referred to related descriptions of other embodiments.

Those skilled in the art may understand that all or part of steps in foregoing embodiments may be executed by a program to instruct related hardware. The program may be stored in a computer readable storage medium. The storage medium may include: Flash disk, read-only memory (ROM), random access accessor (RAM), disk or optical disk.

The method and the device for processing a picture and the electronic device provided by the embodiments of the present disclosure are described above in detail. Specific examples are used herein to describe the principles and embodiments of the present disclosure. The above embodiments are only used to understand the method according to the present disclosure and the key principle. Meanwhile, for those skilled in the art, according to the idea of the present disclosure, there will be changes in the specific implementation and the application scope. In conclusion, the content of this specification should not be understood as a limitation of the present disclosure.

In the description of the specification, descriptions of terms such as "an embodiment," "some embodiments," "an example," "a specific example," or "some examples," mean that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. Moreover, without contradiction, those skilled in the art could combine different embodiments or different characteristics in embodiments or examples described in the present disclosure.

Moreover, terms of "first" and "second" are only used for purpose of description and cannot be seen as indicating or implying relative importance or indicating or implying the number of the indicated technical features. Thus, the features defined with "first" and "second" may include or imply at least one of these features. In the description of the present disclosure, the term "a plurality of" means at least two, such as two, three or the like, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer-readable medium comprise (a non-exhaustive list): an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method for the present disclosure may be achieved by commanding the related hardware with programs, the programs may be stored in a computer-readable storage medium, and the programs include one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc. Although embodiments of present disclosure have been shown and described above, it should be understood that above embodiments are just explanatory, and cannot be construed to limit the present disclosure, for those skilled in the art, changes, variations, alternatives, and modifications can be made to the embodiments within the scope of the present disclosure.

What is claimed is:

1. A method for processing a picture, applied for an electronic device including a processor, the method comprising:

scaling a raw picture to obtain N scaled pictures having different resolutions, where N is a natural number equal to or greater than 2;

mapping the N scaled pictures respectively into N content pictures each having a same predetermined style feature by using a neural algorithm network;

scaling the N content pictures to a same resolution; and encoding and combining the N content pictures having the same resolution into a dynamic video;

wherein the neural algorithm network comprises an image conversion network and a loss network, and mapping the N scaled pictures respectively into the N content pictures each having the same predetermined style feature by using the neural algorithm network comprises:

calculating a reconstruction loss via the loss network, wherein the reconstruction loss is a loss between a raw image and an output image of the image conversion network with the raw image as an input;

determining a mapping weight parameter of the neural algorithm network based on the reconstruction loss; and mapping the N scaled pictures respectively into the N content pictures each having the same predetermined style feature based on the mapping weight parameter.

2. The method of claim 1, wherein N is a product of a number of frames contained in the dynamic video and a playing time length of the dynamic video.

3. The method of claim 1, wherein mapping the N scaled pictures respectively into the N content pictures each having the same predetermined style feature by using the neural algorithm network comprises:

adding a noisy background picture into each of the N scaled pictures; and mapping the N scaled pictures each added with the noisy background picture respectively into the N content pictures each having the same predetermined style feature.

4. The method of claim 1, wherein the loss network is configured to define a feature reconstruction loss function and a style reconstruction loss function, and calculating the reconstruction loss via the loss network comprises:
calculating a first high-order semantic loss between the raw image and the output image of the image conversion network with the raw image as an input, via the feature reconstruction loss; and
calculating a second high-order semantic loss between a style image and an output image of the image conversion network with the style image as an input, via the style reconstruction loss function.

5. The method of claim 4, wherein determining the mapping weight parameter of the neural algorithm network based on the reconstruction loss comprises:
determining the mapping weight parameter based on the first high-order semantic loss and the second high-order semantic loss.

6. The method of claim 1, wherein scaling the raw picture to obtain the N scaled pictures having different resolutions comprises:
scaling the raw picture to obtain the N scaled pictures having different resolutions by modifying a picture property of the raw picture, wherein the picture property comprises at least one of picture size, picture format, and picture compression mode.

7. An electronic device, comprising a processor, a memory, a communication interface and a bus,
wherein the processor, the memory and the communication interface are connected to each other and communicate with each other via the bus;
the memory is a non-transitory computer readable medium configured to store executable program codes;
when reading the executable program codes stored in the memory to run a program corresponding to the executable program codes, the processor is configured to:
scale a raw picture to obtain N scaled pictures having different resolutions, where N is a natural number equal to or greater than 2;
map the N scaled pictures respectively into N content pictures each having a same predetermined style feature by using a neural algorithm network;
scale the N content pictures to a same resolution; and
encode and combine the N content pictures having the same resolution into a dynamic video;
wherein the neural algorithm network comprises an image conversion network and a loss network, and the processor is further configured to:
calculate a reconstruction loss via the loss network, wherein the reconstruction loss is a loss between a raw image and an output image of the image conversion network with the raw image as an input;
determine a mapping weight parameter of the neural algorithm network based on the reconstruction loss; and
map the N scaled pictures respectively into the N content pictures each having the same predetermined style feature based on the mapping weight parameter.

8. The electronic device of claim 7, wherein N is a product of a number of frames contained in the dynamic video and a playing time length of the dynamic video.

9. The electronic device of claim 7, wherein the processor is further configured to:
add a noisy background picture into each of the N scaled pictures; and
map the N scaled pictures each added with the noisy background picture respectively into the N content pictures each having the same predetermined style feature.

10. The electronic device of claim 7, wherein the processor is further configured to:
scale the raw picture to obtain the N scaled pictures having different resolutions by modifying a picture property of the raw picture, wherein the picture property comprises at least one of picture size, picture format, and picture compression mode.

11. The electronic device of claim 7, wherein the loss network is configured to define a feature reconstruction loss function and a style reconstruction loss function, and the processor is further configured to:
calculate a first high-order semantic loss between the raw image and the output image of the image conversion network with the raw image as an input, via the feature reconstruction loss; and
calculate a second high-order semantic loss between a style image and an output image of the image conversion network with the style image as an input, via the style reconstruction loss function.

12. The electronic device of claim 11, wherein the processor is further configured to:
determine the mapping weight parameter based on the first high-order semantic loss and the second high-order semantic loss.

13. A non-transitory computer readable storage medium, configured to store an application program, wherein the application program is configured to:
scale a raw picture to obtain N scaled pictures having different resolutions, where N is a natural number equal to or greater than 2;
map the N scaled pictures respectively into N content pictures each having a same predetermined style feature by using a neural algorithm network;
scale the N content pictures to a same resolution; and
encode and combine the N content pictures having the same resolution into a dynamic video;
wherein the neural algorithm network comprises an image conversion network and a loss network, and the application program is further configured to:
calculate a reconstruction loss via the loss network, wherein the reconstruction loss is a loss between a raw image and an output image of the image conversion network with the raw image as an input;
determine a mapping weight parameter of the neural algorithm network based on the reconstruction loss; and
map the N scaled pictures respectively into the N content pictures each having the same predetermined style feature based on the mapping weight parameter.

14. The non-transitory computer readable storage medium of claim 13, wherein N is a product of a number of frames contained in the dynamic video and a playing time length of the dynamic video.

15. The non-transitory computer readable storage medium of claim 13, wherein the application program is further configured to:
add a noisy background picture into each of the N scaled pictures; and map the N scaled pictures each added with the noisy background picture respectively into the N content pictures each having the same predetermined style feature.

16. The non-transitory computer readable storage medium of claim 13, wherein the application program is further configured to:
scale the raw picture to obtain the N scaled pictures having different resolutions by modifying a picture property of the raw picture, wherein the picture property comprises at least one of picture size, picture format, and picture compression mode.

17. The non-transitory computer readable storage medium of claim 13, wherein the loss network is configured to define a feature reconstruction loss function and a style reconstruction loss function, and the application program is further configured to:
calculate a first high-order semantic loss between the raw image and the output image of the image conversion network with the raw image as an input, via the feature reconstruction loss; and
calculate a second high-order semantic loss between a style image and an output image of the image conversion network with the style image as an input, via the style reconstruction loss function.

* * * * *